United States Patent [19]

Dalziel

[11] 4,188,000
[45] Feb. 12, 1980

[54] AIR RESCUE NET

[76] Inventor: David G. Dalziel, 83 E. Laurel Ave., Lake Forest, Ill. 60045

[21] Appl. No.: 926,376

[22] Filed: Jul. 20, 1978

Related U.S. Application Data

[63] Continuation-in-part of Ser. No. 819,411, Jul. 26, 1977, abandoned.

[51] Int. Cl.² .............................................. B64D 9/00
[52] U.S. Cl. .................................. 244/137 P; 182/138
[58] Field of Search ............ 244/118 P, 137 R, 137 P, 244/138 R; 9/14; 182/137, 138, 139; 258/1.2, 1.8

[56] References Cited

U.S. PATENT DOCUMENTS

| | | | |
|---|---|---|---|
| 1,822,658 | 9/1931 | Kampmeyer | 258/1.8 |
| 3,158,357 | 11/1964 | Campbell | 258/1.2 |
| 3,176,327 | 4/1965 | Oberth | 9/14 |
| 3,934,847 | 1/1976 | Bentivegna | 244/137 P |

*Primary Examiner*—Charles E. Frankfort
*Attorney, Agent, or Firm*—Robert D. Farkas

[57] ABSTRACT

A net is mounted to hang freely from the end of a pair of pivotally secured arms extending from the underside of a helicopter. The arms and net hang down in a vertical position when the helicopter is in flight and a motorized lifting mechanism raises the arms and net into a forward horizontal position for particular rescue missions or on land. A movable weight is guided along a tube extending adjacent the rear of the helicopter to balance the weight of the arms and net. A resilient bumper is mounted on the front of the net and a locking mechanism secures the arms in the horizontal position. The lifting mechanism is mounted close to the center of gravity of the helicopter to avoid balance problems.

6 Claims, 5 Drawing Figures

U.S. Patent  Feb. 12, 1980  4,188,000
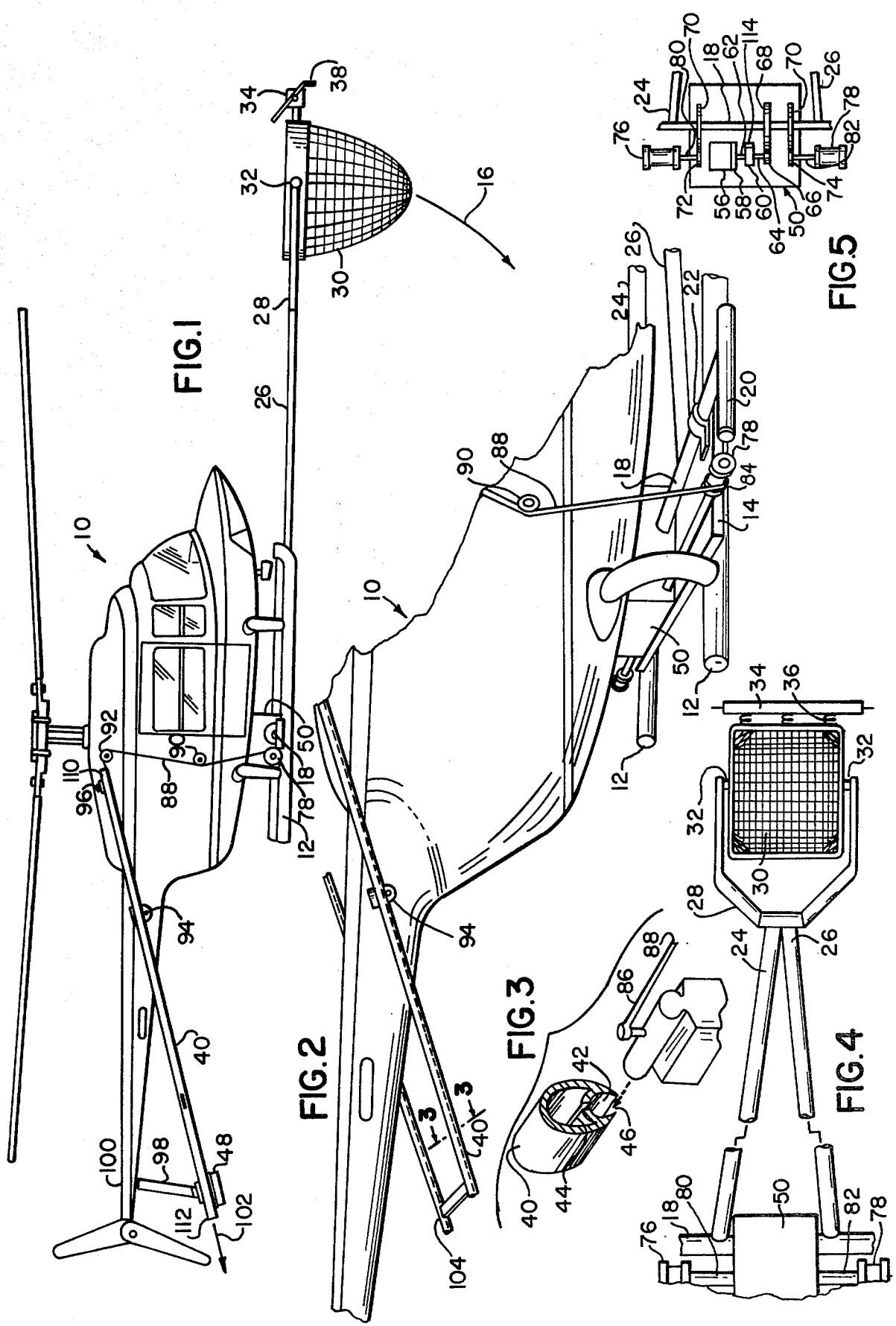

AIR RESCUE NET

BACKGROUND OF THE INVENTION

1. Field of the Invention

This application is a continuation-in-part of prior U.S. application Ser. No. 819,411 filed July 26, 1977 and now abandoned.

The present invention relates to helicopter rescue devices and particularly to a net and support arrangement pivotally secured to the underside of a helicopter in a balanced manner.

DESCRIPTION OF THE PRIOR ART

Presently available air rescue devices are generally in the form of nets or supports which hang down vertically from a boom mounted on an upper side of a helicopter. The nets cannot be supported rigidly in a forward position and the weight of a load at a distance from the center of gravity causes an undesired tilting of the helicopter. Examples of such devices are shown in U.S. Pat. Nos. 2,738,939, issued Mar. 20, 1956 and 3,228,044, issued Jan. 11, 1966.

SUMMARY OF THE INVENTION

It is therefore the primary object of the present invention to provide a rescue net for a helicopter which can be raised from a vertical to a horizontal position and which is supported in a substantially continuously balanced manner on the underside of the aircraft during such raising operation.

This is achieved by a pair of arms pivotally secured under the helicopter adjacent the center of gravity, with the net hanging freely at the end of the arms. When the helicopter is in flight, the arms and net hang vertically, while a motor operated lifting mechanism raises the arms and net into a horizontal forwardly extending position when the helicopter is on land or for particular rescue missions. A locking mechanism secures the arms in the horizontal position and the net includes a resilient bumper on the front end. A longitudinal tube having a slidable weight extends adjacent the rear of the helicopter to balance the weight of the arms and net. Other objects and advantages will become apparent from the following description taken in conjunction with the accompanying drawings.

BRIEF DESCRIPTION OF THE DRAWINGS

FIG. 1 is a side elevation view of the helicopter and the arms and net shown disposed in a horizontal position;

FIG. 2 is a partial perspective view of the rear and underside portions of the fuselage of the portions of the apparatus shown in FIG. 1;

FIG. 3 is a partial cross-sectional side elevation view, taken along line 3—3 viewed in directions of arrows 3—3, of the apparatus shown in FIG. 2, and the slidable weight apparatus shown in FIG. 1;

FIG. 4 is a top plan view of a portion of the apparatus shown in FIG. 1; and

FIG. 5 is a top plan view of a portion of the apparatus shown in FIG. 2.

DESCRIPTION OF THE PREFERRED EMBODIMENT

As shown in FIGS. 1 through 5 a helicopter 10 employs net 30 secured to arm 26 by way of yoke 28. Axle 32 permits net 30 to pivot there-around. The forward edge of the net includes a resilient bumper guard 34, such as of soft rubber, secured to the net by spring members 36 which provide vibration damping. A curved metal or plastic arm 38 at the ends of the bumper provide a guide which moves from the angled position to a vertical position when an object contacts the front of the bumper. Skids 12 are shown secured to the helicopter utilizing strut 84 therefor. Cable 88 is shown extending upwardly from drum 78. Arm 26 is shown attached to shaft 18 so that upon the rotation of shaft 18 net 30 may move in the direction of arrow 60. Cable 88 passes over pulleys 90 and 92 and enters an opening, not shown, in hollow tubular spar 40. Such opening, adjacent uppermost end 110 of spar 40, is located in an upper and forwardmost position relative to end 112 of the spar. End 110 of spar 40 is located above arm 26, a the end thereof adjacent shaft 18. The rearmost end of cable 88 is connected to weight 48 which utilized gravity to pull weight 48 in the direction of arrow 102. Brackets 94 and 96 secure spar 40 to the fuselage as does spar 98, adjacent tail section 100. Housing 50 contains a gear train which couples drum 78 and shaft 18 together.

Hollow tubular spar 104 is shown disposed on an opposite side of the fuselage, opposite to spar 40. A weight, not shown, slideably engaged in spar 104 as is weight 48. Spar 40 is provided with elongated opening 42 which has slots 44 and 46 communicating thereto. Weight 48 slides along the passageway communicating with opening 42 having a portion thereof extending downwardly and outwardly from spar 40. End 86, of cable 88, is secured to weight 48 controlling the position of the weight along the length of the passageway. Plate 14 is shown mounted on skids 12 and is used to support housing 50 thereon. Shaft 18 is shown journalled to plate 14 utilizing bearing 22 therefor. The end of shaft 18 is journalled into a bearing, not shown, housed within tube 20. Arm 24 is also secured to shaft 18 and is shown coupled to yoke 28 having axles 32 extending inwardly from the ends thereof so as to support net 30 pivotably. Shafts 80 and 82 extend outwardly from housing 50 and carry drums 76 and 78 thereon. End 84, of cable 88, is shown secured to drum 78, having the adjacent portions thereof wrapped about the surface of drum 78. Thus, when shaft 82 rotates cable 88 may be caused to move upwardly or downwardly, dependent upon the direction of rotation of the drum. Another cable, not shown, is similarly fastened to drum 76 which is coupled to the weight residing in slideable engagement with spar 104. When shaft 18 turns some 90 degrees, arms 24 and 26 pivot between the horizontal position, shown in FIG. 1, and a vertical position, not shown, as net 30 moves downwardly in the direction of arrow 16.

Housing 50 contains electrically operated motor 56 which is adapted with a slip clutch. Thus, output shaft 62 will rotate only when forces exerted on shaft 62 do not overcome the slipping tendencies of clutch 58. Clutch 58 may be of the frictional variety or, if desired, of a hydraulic nature. Clutch 58 is a frictional clutch that may consist of, if desired, two plates engaging one another, having a common surface adapted for frictional coupling, but being able to slip relative one to another when the drag forces exerted on shaft 62 differ from the forces produced by motor 56. Brake 60 is shown coupling shaft 62 to shaft 64. The housing of brake 60 is shown connected to block 114. Block 114 is secured to plate 14. Thus, brake 60, being of any conventional variety, such as an electrically operated brake, when locked, prevents rotation of shaft 64, as well as shaft 62. In the locked position, brake 60 will prevent motor 56, if operated, from further movement of arms 24 and 26. This is due to the slipping action of clutch 58. Spur gear 66 is coupled to larger spur gear 68. Larger spur gear is secured to shaft 18 and is coaxially aligned therewith. Thus, when brake 60 is locked, shaft 18 is not free to rotate. When brake 60 is unlocked, motor 56 is capable of driving shaft 18 at slower speeds than the operational speed of the motor, because of the ratio between spur gear 66 and gear 68, to which it is coupled. However, when brake 60 is locked, despite the operation of motor 56, shaft 18 will not turn at all. This provides a safe and secure positioning for net 30, at any desired location, when brake 60 is locked. When the brake is released, the amount of friction coupling of clutch 58 determines the amount of force exerted on net 30 required to move net 30 in a downward position, in the direction of arrow 16. A suitable electrical control circuit, comprising a series electrical circuit involving a switch, the helicopter battery, each not shown, and the brake, controls the operation of brake 60. In likewise fashion, a suitable another switch and the helicopter battery, each not shown, in another series electrical circuit with motor 56, may be employed to operate same at times other than the period of time that brake 60 is locked. If desired, a hydraulically operated frictional slipping clutch may be employed for clutch 58, a hydraulically operated motor may be employed for motor 56, and a hydraulically operated brake mechanism may be employed for brake 60, each of well known design, operated from a convenient source of hydraulic power, not shown, carried within helicopter 10. Spur gears 70 engage smaller spur gears 72 and 74. Spur gears 70 are secured for concurrent rotation with shaft 18. Shafts 80 and 82, each carry drums 76 and 78 secured to the ends thereof. Thus, when motor 56 is made operational in a preferred direction, shaft 18 is operating at slower speeds so as to cause arms 24 and 26 to pivot about the longitudinal axis of shaft 18. Net 30 is permitted to be lowered to a vertical position or raised to a horizontal position only when brake 60 is unlocked and motor 56 is operated in the proper direction. Forces exerted on drums 76 and 78 are modified and applied to shaft 18 in accordance with the ratio of the diameters of gear 70 to gear 74 and gear 70 to gear 72. End 84 of cable 88, as applied to drum 78, permits a force to be exerted on drum 78 so as to enable arms 24 and 26 to be pivoted in a horizontal direction. When net 30 comes downwardly to a position beneath the fuselage, then weight 48 ascends upwardly along tube 40 so as to reside closer to the center of the helicopter. This set of motions causes net 30 to hang directly downwardly from helicopter 10 whilst weight 48 assumes a position close to the center of gravity of the aircraft, tending to minimize the unbalancing effects that would occur by changing the angle of elevation of arm 26 alone. Obviously, the ratio of diameter of gears 74 and 70, the diameter of the portion of drum 78 upon which end 84 of cable 88 is attached and the angle and length of hollow spar 40 will determine the effectiveness of achieving a perfectly balanced condition for all angular positions of arms 26 and 24. Though gears 70 and 72 and gears 70 and 74 are shown as spur gears, each pair in a two gear gear train, each pair of gears may be replaced by a gear train, not shown, whose gear ratios are such that shafts 80 and 82 turn many times more than the number of turns that shaft 18 would rotate upon the operation of motor 56. This fact, coupled with a large diameter construction for drums 76 and 78 permits cable 88 to move a substantial distance upon only a 90 degree rotation of arms 24 and 26.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

I claim:

1. An air rescue device for use with a slowly moving aircraft comprising support means secured to the underside of an aircraft, a shaft, said shaft rotatably journalled to said support means, a pair of rigid longitudinal arms being secured to and extending from said shaft, a net pivotably supported at the end of said arms, drive means for raising said arms and net from a downward vertical position to a horizontal position, said drive means being coupled to said shaft, means for counterbalancing the weight of said arms and said net.

2. The device of claim 1 wherein said counterbalancing means includes an elongated guideway, one end of said elongated guideway being disposed above said shaft and above said underside of said aircraft, the other end of said elongated guideway extending rearwardly and downwardly from said underside of said aircraft outside of the fuselage of said aircraft, a weight slidable along said guideway, and a cable and drive mechanism for pulling said weight along said guideway to balance the weight of said arms and net upon movement between said vertical and horizontal positions, whereby said weight is pulled downwardly by the force of gravity when said underside of said aircraft is disposed in a position below the cabin portions of said aircraft tending to apply a rotational force to said shaft which tends to move said net from said vertical position to said horizontal position.

3. The device of claim 2 further comprising a first gear, a second gear, said first gear fixedly secured to said shaft and coaxially aligned therewith, said second gear engaging said first gear rotationally, a drum, said drum coaxially aligned and fixedly secured to said second gear, said first gear having a different diameter than said second gear, a cable, one end of said cable fixedly secured to said drum, said cable having a portion thereof wound about said drum, the other end of said cable fixedly secured to said weight, a portion of said cable disposed intermediate said one end and said other end thereof being disposed adjacent to said one end of said elongated guideway.

4. The device of claim 1 wherein said net includes a resilient bumper.

5. The device of claim 1 wherein said drive means includes an electrically operated drive motor, means to lock said arms in said horizontal position.

6. The device of claim 1 wherein said support means is positioned below and adjacent the center of gravity of said aircraft.

* * * * *